March 15, 1938.  J. C. SHANNON  2,111,497
HOT TAMALE DISPENSER
Filed April 12, 1937  2 Sheets-Sheet 1
Fig.1.  Fig.2.
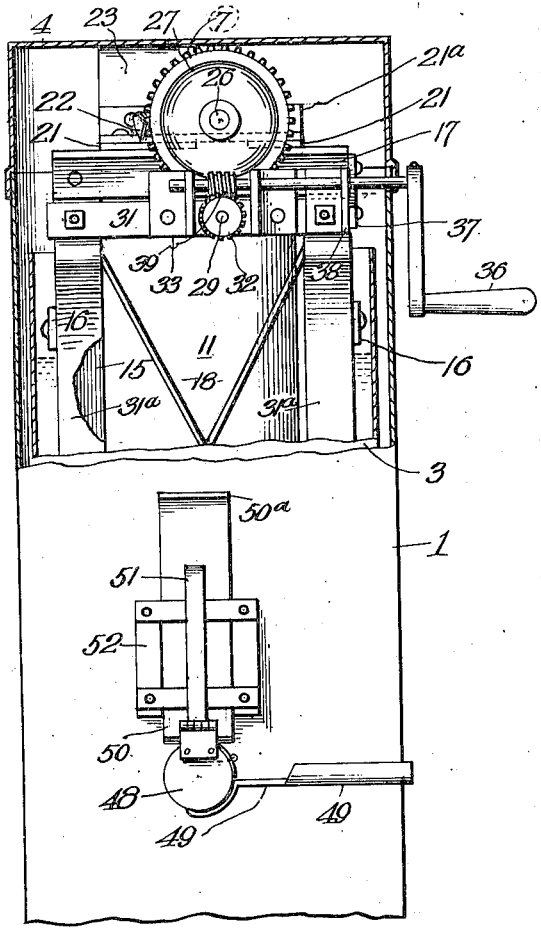
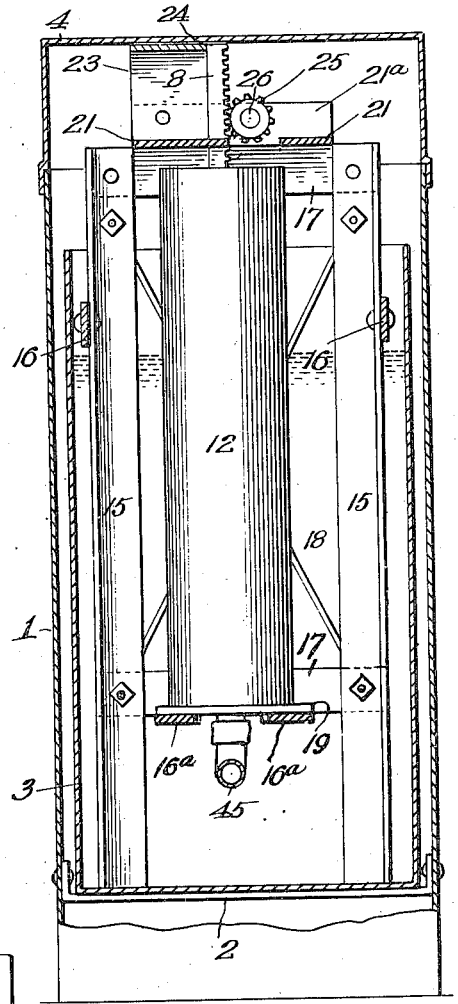
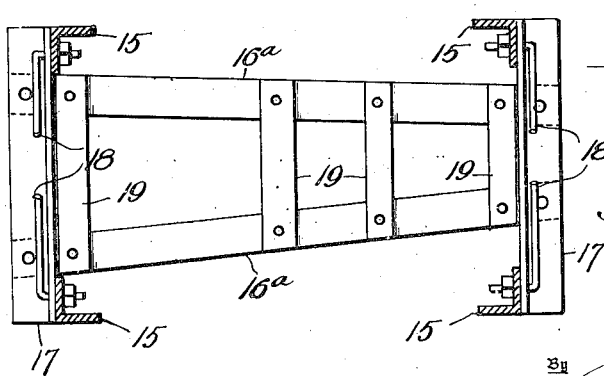
Fig.5.
Inventor
J. C. Shannon
By Thorpe & Thorpe
Attorneys March 15, 1938.  J. C. SHANNON  2,111,497
HOT TAMALE DISPENSER
Filed April 12, 1937  2 Sheets-Sheet 2
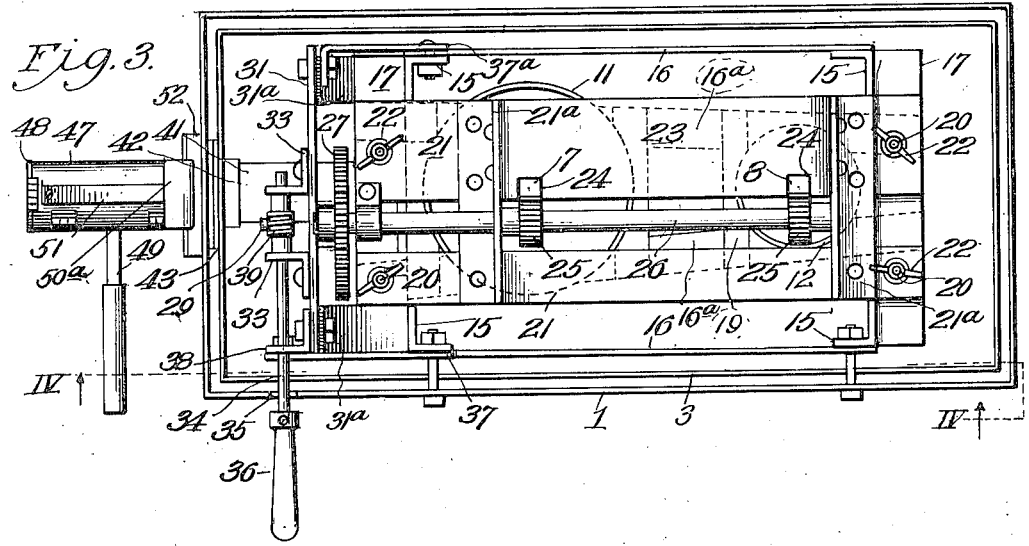
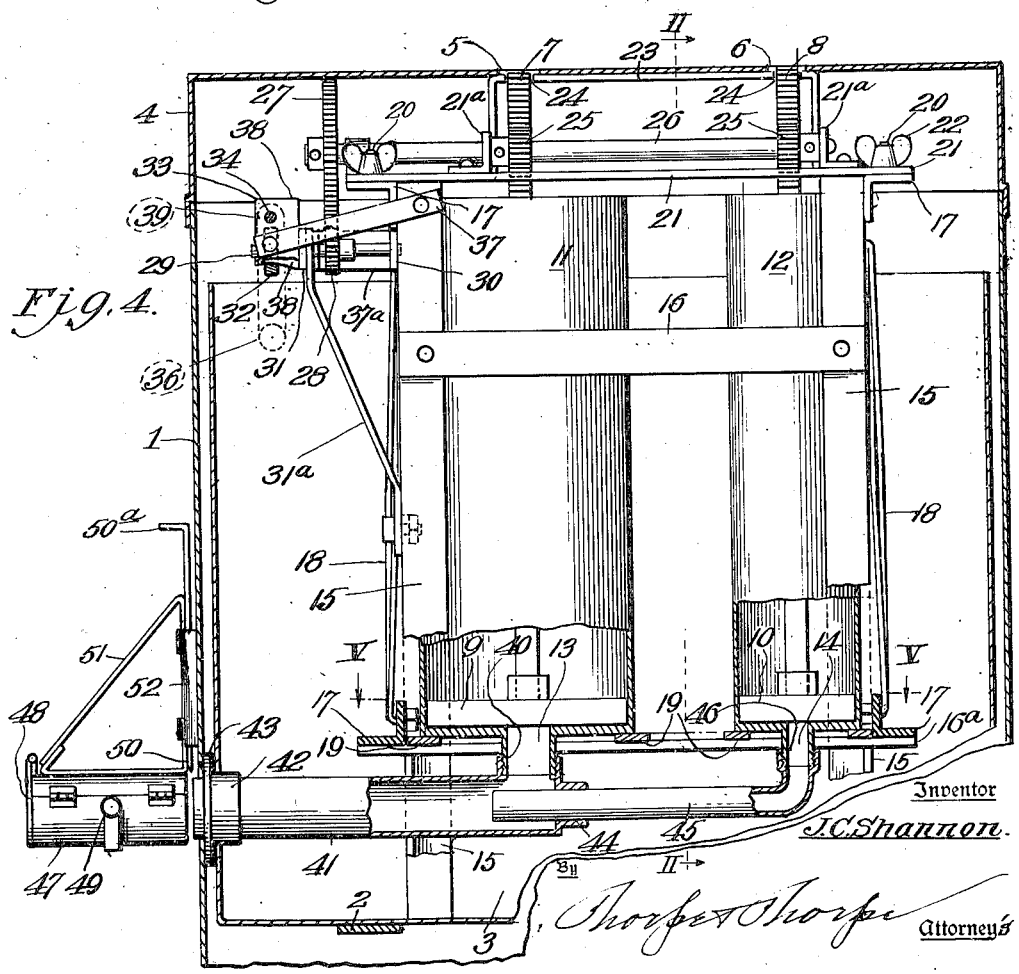

Patented Mar. 15, 1938

2,111,497

UNITED STATES PATENT OFFICE 2,111,497

HOT TAMALE DISPENSER

James C. Shannon, Kansas City, Kans., assignor of one-half to Dewey Lee Qualls, Kansas City, Kans.

Application April 12, 1937, Serial No. 136,368

3 Claims. (Cl. 107—1)

This invention relates to means for the purveying of corn meal paste products, particularly, hot tamales, scrapple, and the like. My object is to provide a process and apparatus for handling of such materials so that they will be maintained in fresh inviting condition over long periods of time, and can be served at will without exposing the mass of the product to drying out or becoming contaminated by exposure to the air.

Generally speaking the broad objects of my invention may be accomplished by precooking the corn meal paste product, and then confining it in a container which is maintained in a hot moist atmosphere so that the water vapor content of the atmosphere admitted to the food container, is higher than the evaporation point of the moisture in the corn meal paste product. In addition to maintaining such atmosphere, the heat is essential to keep the product in edible condition for instant vending. Also in addition to maintaining the moisture conditions of the products, it is essential that means shall be provided for withdrawing the desired amount of contents without subjecting the mass of material in the container to an evaporating atmosphere since it has been found that if this occurs, repeated exposures result in drying out the paste corn meal product, and eventually such dried material will flake off in the form of hard pellets. Obviously, the discovery of such pellets by a customer will lead to disagreeable consequences. One means of accomplishing the desired result is by maintaining the food container in a hot moist atmosphere as by submergence in a water bath or water tank, in which the water is held at a temperature of between 100° F., and the boiling point and the vapor is confined for admission to the food container or containers. Another method of accomplishing the same result is by subjecting the container externally to dry heat and injecting or maintaining water or water vapor in the upper part of the container, to make a water seal against exposure of the corn meal paste to atmospheric conditions.

In order that the invention may be fully understood reference is to be had to the accompanying drawings in which one suitable form of apparatus for carrying out the vending of corn meal paste products is disclosed. The drawings illustrate a two container vending machine for the storage and vending, in molded form, at demand, of hot tamales, although a one container machine could be used for the vending of scrapple or similar product. In the drawings:

Figure 1 is an elevational view with the housing, cover and water tank therein partly broken away.

Figure 2 is a vertical section on the line II—II of Figure 4.

Figure 3 is a top plan view with the cover omitted.

Figure 4 is a vertical section with the housing and tank broken away at one lower corner, the section being on the line IV—IV of Figure 3.

Figure 5 is a horizontal section on the line V—V of Figure 4.

In the said drawings, 1 is a housing open at the top and bottom and near the latter equipped with an internal skeleton support 2, for a water tank 3, and with a removable cover 4, which might be on the water tank if desired, having openings 5 and 6 through which vertical rack bars 7 and 8 respectively are adapted to reciprocate. These rack bars may, if desired be provided with vertical housings, not shown, carried by the cover of the machine. The rack bars are equipped at their lower ends with presser heads or pistons 9 and 10 respectively, fitting snugly within vertical cylindrical holders or containers 11 and 12, which are open at their upper ends and are provided at their lower ends with central discharge orifices 13 and 14. The orifice 13 and its holder 11 is larger than the orifice 14 and its holder 12.

A rigid skeleton frame stands within and on the bottom of the tank, and is shown as composed of corner angle-iron uprights 15 connected at spaced points by longitudinally-extending horizontal bars 16 and 16a, and horizontal cross bars 17, the latter being of angle-iron type. The frame is stiffened by cross braces 18, underlying the top bars 17, and each brace extends from the upper part of one corner bar to the lower end of the other of the transversely-opposite corner bars. The frame also includes a skeleton bottom, consisting of cross bars 19 connecting the lower bars 16a, and underlies and rigidly supports the containers, and the top cross bars 17, are equipped with immovable upwardly projecting bolts 20.

A horizontal top frame of rigid skeleton type composed of spaced plates 21 and spaced cross bars 21a, rests upon and is bolted to top cross bars 17 and is centered relative to the holders by fitting upon the bolts 20 engaged by clamping nuts 22. Said top has an upstanding inverted U-extension 23 provided with notches 24, through which the rack bars extend and reciprocate, the notches serving as guides to cooperate with a pair of cog-pinions 25, in preventing tilting or twisting of the rack bars as they are reciprocated by rotation of said pinions.

The cog pinions are rigidly affixed upon a shaft 26 journaled in the top frame, and the left hand end of the latter is equipped with a large gear wheel 27, intermeshed with an underlying smaller gear wheel 28 secured on a shaft 29 journaled in cross bars 30 and 31 of the holder support frame, the bar 31 being parallel with and spaced from the bar 30, but rigidly connected to said frame by braces 31a. A worm wheel 32 is secured upon shaft 29 between a pair of short vertical angle bars 33 forming journals for a shaft 34 which projects through a notch 35 in the housing and is equipped with a crank handle 36 exterior to the housing, and within and close to the latter, the bar 31 is braced by bars 37 and 37a, from the holder support frame and carries a third journal bar 38 for the said shaft. The said shaft is provided with a worm 39 intergeared with the worm wheel, so that operation of the crank handle through the chain of gearing described, shall effect vertical movement of the rack bars and pistons upwardly or downwardly accordingly as the crank handle is turned in one direction or the other.

Depending from the holder 11 and providing an extension of the orifice thereof, is a tube 40 which is detachably affixed to and communicates with a substantially horizontal tube 41 extending through a flanged collar 42 secured to the housing and tank, a gasket 43 between the tank and collar flange making leakage impossible. At the end where it communicates with the depending tube 40, the tube 41 has a reduced central extension 44, and fitting therein and extending into the tube 41 to a plane beyond the opposite side of the tube 40, is a tube 45 which, at its opposite end, curves upwardly and fits upon a depending tube 46 of holder 12. By the arrangement of parts described, material in the holders, through downward travel of the presser heads or pistons can be forced into tubes 41 and 45, the arrangement being such that material shall be extruded from tube 45 about the time material from holder 11 within tube 41 has accumulated to about the discharge end of tube 45, so that in the further travel of both materials that, from the smaller, shall constitute a core for the other, in fact shall be a hot tamale, lacking the husk wrapper or the like.

Alined with but spaced slightly from the discharge or external end of the tube 41 is a tube 47 having a hinged cap 48 at its outer end. The tube 47 is composed of two hinged sections, one section being in fixed relation to the housing and the other constituting a door which, when opened, as by handle 49, permits a tamale ready for consumption to be dropped onto a plate or the like, held below the tube. However, before the tamale is discharged, its full length must be indicated through its pressure on the pendently hinged cap to effect a slight opening movement thereof, and following this indication, the material must be completely severed between the adjacent discharge and receiving ends of the tube 41 and 47, respectively. This severance is effected by a vertical cutter 50 slidable in a guide 49 fastened to the housing. The upper end of the cutter has an arm 50a projecting outwardly from the housing to serve as a handle in depressing or reelevating the cutter. The tube 47 is supported by a triangular bracket frame 51 rigidly fastened to a guide 52 secured to the housing, the guide and tube 47 cooperating in insuring perfect up and down movement of the cutter by preventing the latter from springing outward relative to the space between the tubes 41 and 47. In dispensing an extruded tamale, as soon as the hinged door starts to open, the operator grasps the inclined handle portion 51 with one hand, and then imposes downward pressure on the top edge 50a of the knife. When the knife has completely severed the tamale its course of independent travel is stopped, and continued downward movement on the knife or on the handle 51 causes the entire tamale cage to move downwardly into close proximity to a plate or the like disposed to receive the tamale. The operator now swings the handle 49 to open the split cage and the tamale is deposited on the plate. The cage and knife may now be elevated to original position, but by preference the knife is left down as it acts as a seal or closure so that the foremost end of the next tamale is not exposed to the atmosphere and is sealed against contamination.

From the above description it will be apparent that I have produced a process and apparatus for the vending or purveying of corn meal paste products which embodies all of the features of advantage set forth as desirable, and while I have described and illustrated the preferred embodiment of the same, it is to be understood that I reserve the right to all changes within the spirit of the invention and without the ambit of the prior art.

I claim:—

1. In combination with a dispensing tube from which a food product is extruded, of a cut-off mechanism comprising a reciprocatory cylinder split longitudinally and hinged to open in two sections, said cylinder being normally in alinement with the extrusion tube but spaced slightly therefrom, a knife carried by the cylinder for severing the food product, said knife and cylinder being mounted for limited independent movement, and means to open the cylinder by swinging its hinged sections to discharge its contents.

2. In a hot tamale dispensing machine, the combination of a water vessel containing hot water at a temperature between the boiling point and 100° F., a closure confining water vapor arising from said vessel, a pair of containers in said vessel having their upper ends opening above the water level therein and below the closure, an extrusion tube leading from one container to the exterior of the vessel, an extrusion tube leading from the other container and terminating within the first-named tube, pistons reciprocating within each of said containers, rack bars for operating said pistons, a frame removably overlying the upper ends of the containers, a shaft journaled in said frame, a pair of gears keyed on the shaft and respectively enmeshed with the rack bars, and means for operating said shaft.

3. In a hot tamale dispenser, the combination with a vessel adapted to contain hot water, a pair of containers within the vessel and communicating at their upper ends with the space in the vessel above the water level therein, a closure for said vessel, an extrusion tube leading from one container to the exterior of the vessel, a smaller extrusion tube leading from the other container and terminating within the first tube at a point within the vessel to maintain the tubes at their point of communication subject to the water temperature in the vessel, pistons for reciprocating in each of said containers, and means for simultaneously advancing said pistons for ejecting the contents of the containers through said extrusion tubes.

JAMES C. SHANNON.